(12) United States Patent
Sarkar et al.

(10) Patent No.: US 8,270,988 B1
(45) Date of Patent: Sep. 18, 2012

(54) DYNAMIC ADDITION OF CARRIER FREQUENCY TO A WIRELESS COVERAGE AREA IN RESPONSE TO LOW LOAD

(75) Inventors: Debasish Sarkar, Irvine, CA (US); Sachin R. Vargantwar, Overland Park, KS (US); Siddharth S. Oroskar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1207 days.

(21) Appl. No.: 12/056,427

(22) Filed: Mar. 27, 2008

(51) Int. Cl.
*H04W 72/00* (2009.01)

(52) U.S. Cl. ............... 455/452.1; 455/453; 370/331; 370/332

(58) Field of Classification Search ............ 370/331, 370/332, 328, 338; 455/452.1
See application file for complete search history.

(56) References Cited

U.S. PATENT DOCUMENTS

| | | | |
|---|---|---|---|
| 5,862,130 A * | 1/1999 | Tat et al. ............. | 370/330 |
| 6,882,850 B2 * | 4/2005 | McConnell et al. ..... | 455/453 |
| 7,133,380 B1 * | 11/2006 | Winters et al. ........ | 370/329 |
| 7,848,758 B1 * | 12/2010 | Sill et al. .............. | 455/452.1 |
| 2001/0005359 A1 * | 6/2001 | Bergqvist .............. | 370/230 |
| 2003/0161283 A1 * | 8/2003 | Tiedemann et al. ..... | 370/329 |
| 2005/0096052 A1 * | 5/2005 | Csapo et al. ............ | 455/439 |
| 2006/0084445 A1 * | 4/2006 | Minami et al. .......... | 455/452.1 |
| 2006/0246917 A1 * | 11/2006 | Jin et al. ................ | 455/450 |
| 2008/0157974 A1 * | 7/2008 | Boss et al. .............. | 340/572.3 |

\* cited by examiner

*Primary Examiner* — Erika Gary
*Assistant Examiner* — Marisol Fahnert

(57) ABSTRACT

A method is disclosed for implementing an overlay carrier frequency in a wireless coverage area in response to low load in the coverage area. Normally, an carrier frequency may be added in response to high load. However, the disclosed method involves adding a carrier frequency in response to low load, as the addition of a carrier may advantageously increase the likelihood of soft handoff in certain situations, and as low load may facilitate operation on the added carrier without the need to add expensive supporting infrastructure that would typically be added to support full operation on an added carrier frequency.

19 Claims, 2 Drawing Sheets

DYNAMIC ADDITION OF CARRIER FREQUENCY TO A WIRELESS COVERAGE AREA IN RESPONSE TO LOW LOAD

BACKGROUND

In a typical cellular radio communications system (wireless telecommunications network), an area is divided geographically into a number of transmission areas, or cell sites. Each cell site is typically defined by a radio frequency (RF) radiation pattern from a base transceiver station (BTS) antenna. The base station antennae in the cells may then be coupled to a base station controller (BSC) (also known as a radio network controller (RNC)), which may in turn be coupled with a telecommunications switch or gateway, such as a mobile switching center (MSC) or packet data serving node (PDSN). And the switch or gateway may then provide connectivity with a transport network such as the Public Switched Telephone Network (PSTN) or the Internet.

When a wireless communication device (WCD), such as a cellular telephone, pager, personal digital assistant (PDA), or appropriately equipped portable computer, is positioned in a cell, the WCD communicates via an RF air interface with the BTS antenna of the cell. Thus, a communication path can be established between the WCD and the transport network, via the RF interface, the BTS, the BSC and the switch or gateway.

With the rapid growth in demand for wireless communications, the level of call traffic in most cell sites has increased dramatically in recent years. To help manage the call traffic, most cells in a wireless network are usually further divided geographically into a number of sectors, each defined by radiation patterns from directional antenna components of the BTS, or by BTS antennae. These sectors (which can be visualized ideally as pie pieces) may be referred to as "physical sectors," since they are physical transmission/reception areas (hereafter "transmission area(s)") of a cell site. Therefore, at any given time, an MS in a wireless network will typically be positioned in a given physical sector and will be able to communicate with the telecommunications network via the BTS serving that physical sector.

In well known CDMA (Code Division Multiple Access) systems, each physical sector is distinguished from geographically adjacent physical sectors by a "PN offset" number or key. PN offsets are pseudo-noise (e.g., deterministic "noise-like" information) that is inserted in the carrier signal for the corresponding sector. When a WCD is in a particular physical sector, communication between the WCD and the BTS of the cell site are encoded by the physical sector's PN offset key, regardless of the carrier frequency being used. This allows the same carrier frequency to be used by geographically adjacent sectors with minimal interference between the sectors occurring.

In areas where wireless communication traffic is particularly high, cell sites in those areas may employ more than one carrier frequency for communicating with the WCDs that are within its transmission/reception area boundaries. The number of carrier frequencies employed by a given cell site may depend on various factors, such as the volume of communication traffic expected. For example, in a congested urban location, cell sites might be designed to employ two or more carrier frequencies, while in more sparsely populated rural areas, cell sites might employ only one carrier frequency.

Cell sites that employ more than one carrier frequency may be termed as having a "primary" carrier frequency and one or more "overlay carrier frequencies." Typically, the primary frequency is the carrier frequency that is implemented by all the cell sites in a particular geography, such as in a particular city and its surrounding area, and is often labeled frequency "F1." Overlay frequencies are then implemented by the cell sites in the geography that carry more traffic than may be handled using only the primary frequency, and are typically labeled "F2", "F3", etc.

In normal operation, when a WCD is operating on a given frequency and moves into a sector of a cell site that is operating on the same frequency, the call will typically continue on that same frequency in the new sector (e.g., if the new physical sector is controlled by the same BSC or both physical sectors are otherwise coupled with common infrastructure). Through communication with the BSC, the WCD may simply begin to use the PN offset key of the new physical sector in order to complete the handoff from one physical sector to the next. This process is called "soft handoff," because, as the call continues on the same carrier frequency, it typically maintains communication on the old PN offset for at least some time after beginning to also communicate on the new PN offset. Such handoff thus tends to be fairly seamless and successful.

In contrast, when a WCD is operating on an overlay frequency carrier signal and the WCD moves into (or toward) a cell site that does not implement that particular overlay carrier frequency ("a hand-down cell site"), a process known as a "hard handoff" may need to occur in order to maintain the call. In a hard handoff, the call is moved from a carrier signal of the overlay frequency to a carrier signal of the primary frequency or to another overlay frequency. Unfortunately, however, since hard handoff involves a change in carrier frequency, communication on the old PN offset and old carrier frequency is typically discontinued before the WCD begins communicating on the new PN offset and new carrier frequency. This process is less seamless and tends to result in more dropped calls than soft handoff.

Consequently, although it may be desirable for a service provider to add overlay carriers in certain high traffic areas, the addition of such carriers may give rise to problems. In particular, addition of overlay carriers may create carrier-discontinuities across cell sites and thus increasing the likelihood of hard handoffs and, in turn, call drops.

OVERVIEW

To help avoid carrier discontinuities across cell sites, and thus to reduce the occurrences of inter-frequency handoff, it may be advantageous to add one or more additional carrier frequencies to hand-down cell sites, so as to give the cell sites the same carrier(s) as their adjacent cell sites. That is, it would be advantageous to add one or more overlay carriers to the hand-down cell sites so that the sites are no-longer hand-down sites but rather support full soft-handoff with their adjacent sites.

Unfortunately, however, implementing overlay carrier frequencies is generally quite expensive. This expense is typically due at least in part to additional equipment costs, such as the cost to add power amplification and backhaul infrastructure to support the additional signaling and bearer traffic that will flow on the added carrier.

Disclosed herein is a method for managing carrier frequency allocation in a wireless communication system, in a manner that accounts for the above issues. According to the method, one or more overlay carriers will be dynamically added to (e.g., activated in) a hand-down cell site in response to the load in the cell site being at a threshold low level. More particularly (by way of example), one or more carriers will be added when the load in the cell site is low enough that the existing cell site infrastructure and/or related infrastructure (e.g., power amplification and backhaul hardware) is sufficient to handle the total load that would likely result upon adding the new carrier(s). Adding one or more carriers in that scenario would thus still provide the significant benefit of reducing the chances of inter-frequency handoff and reducing the likelihood of call drops (by matching carriers across sector boundaries), but at a far lower cost.

At first glance, those of ordinary skill in the art may consider this method to be counter-intuitive, since, as noted above, it would seem sensible to add an overlay carrier to a cell site in response to high traffic in the cell site. Thus, it would seem nonsensical to add an overlay carrier to the cell site in response to low load in the cell site. However, for the reasons noted above, the method is actually surprisingly advantageous, as it provides the benefit of reducing the occurrences of inter-frequency handoff without incurring the full additional cost (in terms of supporting infrastructure) that would normally be incurred when adding an overlay carrier.

These as well as other aspects, advantages, and alternatives will become apparent to those of ordinary skill in the art by reading the following detailed description, with reference where appropriate to the accompanying drawings.

DETAILED DESCRIPTION

Figure 1:
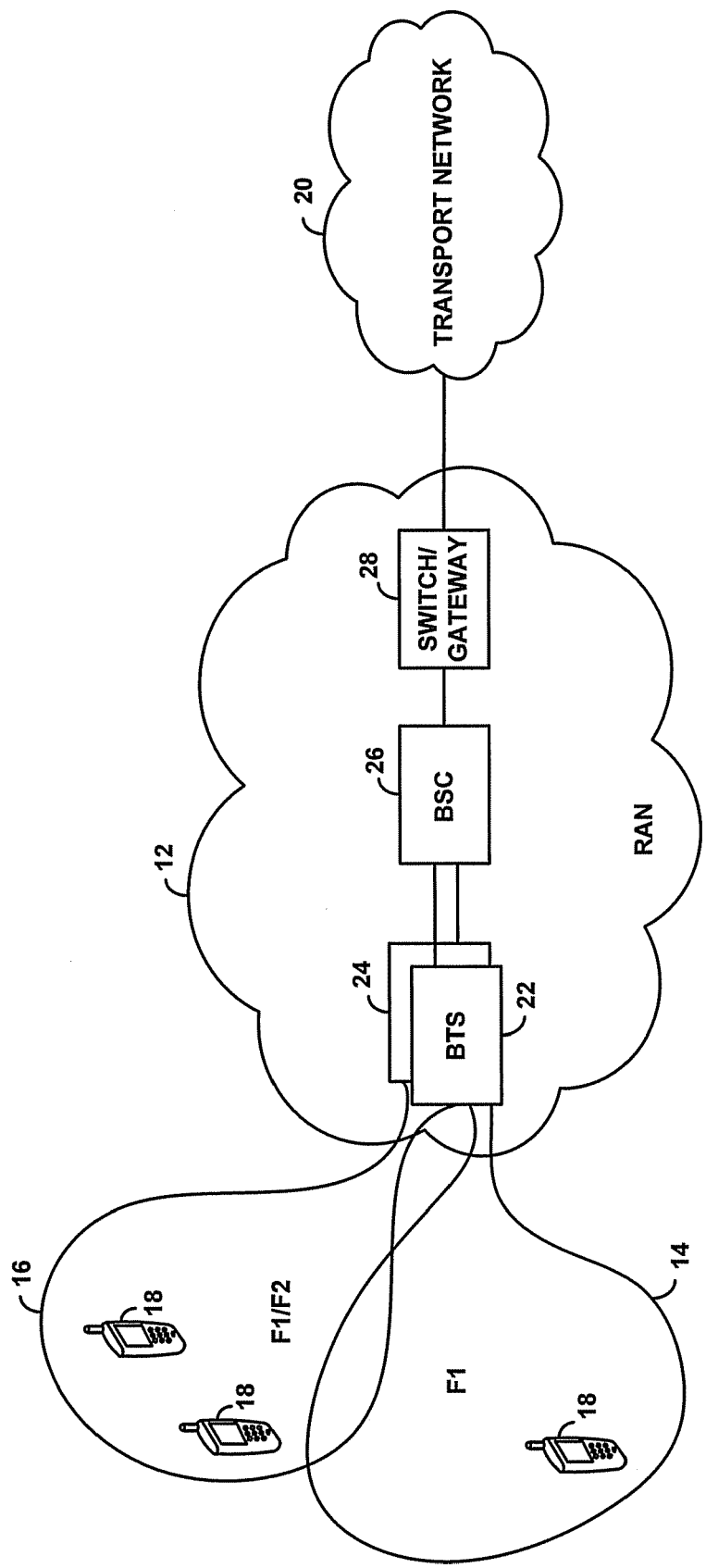
FIG. 1 is a simplified block diagram of network in which the present method can be implemented.

Referring to the drawings, as noted above, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

As shown in FIG. 1, the exemplary network includes at its core a radio access network (RAN) 12 that radiates to define a plurality of wireless coverage areas, including representative coverage areas 14, 16. Shown operating in the various coverage areas by way of example are WCDs 18, which communicate over the air with the RAN 12. In practice, RAN 12 may then be coupled with one or more transport networks, such as representative network 20. With this arrangement, each served WCD can engage in wireless communication with the RAN and may thereby communicate with other entities, such as other WCDs served by the RAN or with entities on transport network 20.

RAN 12 can generally take any form, the particular details of which are not critical to this disclosure. At a rudimentary level, for instance, the RAN may comprise a simple wireless access point router or switch, which communicate on one side with served WCDs and connects on the other side with the transport network.

At a more complex level (as shown), but still by way of example, the RAN may be a cellular radio access network. As shown, such a network may have a plurality of BTSs (or more generally "base stations"), including representative BTSs 22, 24, each of which provides antenna elements that radiate to define a respective cell site and perhaps a set of cell sectors. In that arrangement, each of the coverage areas 14, 16 may comprise one or more sectors and/or one or more cell sites for instance. The BTSs are in turn shown coupled with a BSC 26, which is then coupled with a switch or gateway 28 that provides connectivity with transport network 20. Each BTS and BSC will preferably include at least one processor, data storage, and program instructions stored in the data storage and executable by the processor, to be able to implement functions described herein for instance.

In general, each coverage area may be configured to operate on one or more carrier frequencies or, more particularly, one or more frequency bands each centered around a respective carrier frequency. For instance, each BTS cell site may be configured to operate on one or more carrier frequencies and may define a set of "frequency-sectors" respectively on each of its carrier frequencies. For example, if BTS 22 operates on carrier frequencies F1 and F2, the BTS might define three frequency-sectors (e.g., at 0°, 120°, and 270° respectively) on frequency F1 and may also define three frequency-sectors (e.g., also at 0°, 120°, and 270°) on frequency F2. A given coverage area that comprises one or more cell sites may thus operate on the number of frequencies used for air interface communication in the cell site(s). Likewise, a given coverage area that comprises one or more sectors may operate on the number of frequencies used for air interface communication in the sector(s).

As shown in FIG. 1, by way of example, coverage area 14 is configured to operate on just frequency F1, while coverage area 16 is configured to operate on both carrier frequency F1 and carrier frequency F2. By way of example and without limitation, coverage area 14 could be a single frequency-sector operating on frequency F1 and coverage area 16 could include coterminous frequency-sectors operating respectively on frequencies F1 and F2. As described above, this configuration may mean that a WCD operating on frequency F2 in coverage area 16 would need to engage in hard handoff (inter-frequency handoff) when moving into coverage area 14, since frequency F2 is not available or operable in coverage area 14. On the other hand, a WCD operating on frequency F1 in either one of the coverage areas may be able to engage in soft handoff when moving into the other coverage area, since frequency F1 is available in both coverage areas.

In practice, RAN 12 may broadcast in each coverage area at least one channel list message (CLM) that specifies the frequencies available for use in the coverage area, so that WCDs moving into the coverage area can determine which frequency to use. In each frequency-sector, for instance, the BTS defining the frequency-sector may broadcast the CLM on the operating frequency of the frequency-sector and may list in the CLM each available operating frequency in the coverage area. If multiple frequencies are listed, then each WCD receiving the CLM may execute a hashing algorithm to determine which frequency to use when initiating a call in the coverage area.

For instance, in coverage area 14, the RAN would transmit a CLM on just frequency F1, and the CLM would list just frequency F1. Thus, a WCD seeking to initiate a call in coverage area 14 (or to hand off to the coverage area) may read the CLM, determine that frequency F1 is the only operating frequency of the coverage area, and initiate the call (or otherwise request service) on frequency F1. On the other hand, in coverage area 16, the RAN would transmit a CLM on frequencies F1 and F2, and the CLM would list both frequencies F1 and F2. Thus, a WCD seeking to initiate a call in coverage area 16 may read the CLM, apply a hashing algorithm to determine which of the listed frequencies to use, and then initiate the call on the determined frequency. In some cases, for load balancing or other reasons, when the RAN receive a request to initiate a call on a given frequency in a multi-frequency coverage area, the RAN may direct the WCD to use another frequency in the coverage area instead.

In a situation where a given coverage area is adjacent to a hand-down coverage area (i.e., one having fewer operating carrier frequencies than the given coverage area), the RAN may limit the CLM in the given coverage area to list just the frequency or frequencies that the given coverage area has in common with the adjacent hand-down coverage area, and the RAN may broadcast the CLM on just the common frequency/frequencies. That way, a WCD that would normally have used a frequency in the given coverage area that the hand-down coverage area does not support will instead use a frequency in the given coverage area that the hand-down coverage does support, thus facilitating soft handoff between the coverage areas. (Again, at times of heavy load or for other reasons, the RAN may direct a WCD in the given coverage area to use a frequency that the hand-down coverage area does not support; but absent such a directive, the WCD would use a frequency on which both coverage areas operate.)

Each coverage area of the RAN may in turn have a limited set of associated resources to support air interface communications with WCDs. For example, a coverage area may have a limited extent of power that it can use for transmissions to WCDs, i.e., for "forward link" transmissions. In practice, for instance, the BTS may have one or more power amplifiers that define a maximum level of available power, and the BTS may need to divvy that power among forward link communications, such as among multiple frequency-sectors of a coverage area, or among a cell site as a whole.

As another example, each coverage area may have a limited number of air interface channels through which the RAN can communicate with WCDs. For instance, each air interface channel may be supported by a respective "channel element" (e.g., circuit cards or other equipment) in the RAN. Yet a limited number of such channel elements may be available in the RAN, on a per coverage area basis for instance. Consequently, a limited number of air interface channels may be available for use in the coverage area.

As still another example, each coverage area may have a limited extent of backhaul infrastructure. For instance, cables or other connections between each BTS and the BSC, or between other RAN elements (or beyond) may have limited bandwidth. As the air interface communications in a coverage area will typically aggregate through these connections, the bandwidth limitations of the backhaul connections will limit the extent of communications the coverage area can support.

Furthermore, for each carrier frequency in a coverage area, additional limitations may exist in terms of the extent of communications the coverage area can support. For example, in each frequency-sector (and thus in a combination of frequency sectors), each air interface channel may be encoded using a coding resource, such as "Walsh codes" or other spreading codes for instance. However, a limited extent of encoding resources (e.g., a limited number of Walsh codes) may be available for use in the frequency-sector. Consequently, a limited number of air interface channels may co-exist in the frequency-sector.

As another example, in each frequency-sector, air interface channels may be defined through time division multiplexing such that the channels are interleaved with each other over time. In that case, however, limitations in terms of the available time and interleaving algorithms may restrict the number of air interface channels that each frequency-sector can support. Still other frequency-specific limitations may exist as well, including but not limited to possible per-frequency limitations on the number of channel elements and the extent of power amplification for instance.

Typically, if a coverage area tends to be heavily loaded, a service provider may modify the coverage area to implement one or more overlay carrier frequencies, in an effort to increase capacity of the coverage area. Adding a carrier frequency to a coverage area can increase capacity of the coverage area by adding the set of resources that each carrier frequency supports. For instance, if each frequency-sector supports a set of 64 Walsh codes per carrier frequency, then adding another carrier frequency (and thus defining another frequency-sector) may add 64 more Walsh codes and thus allow possibly 64 additional air interface channels in the coverage area. As another example, if each frequency-sector supports a certain number of interleaved timeslots, adding another carrier frequency may add that same number of timeslots again to the coverage area.

Furthermore, as noted above, it would be advantageous to add a carrier frequency to a coverage area that is adjacent to a hand-down coverage area, so as to facilitate or increase the likelihood of soft handoff between the coverage areas. For instance, in the arrangement of FIG. 1, it would be advantageous to add frequency F2 to coverage area 14, so that coverage areas 12 and 14 would both operate on frequencies F1 and F2. Adding a carrier frequency to the coverage area in this arrangement would tend to increase the number of soft handoffs between the coverage areas, as a WCD operating on either carrier frequency in one coverage area could in theory hand off to the other coverage area without the need to change carrier frequencies.

Unfortunately, however, as also noted above, adding another carrier frequency to a coverage area can be quite expensive, due to the need for additional infrastructure to support the additional communications that the added frequency will carry. For example, to support an additional 64 channels, it may be necessary to install and implement a number of additional channel elements in the RAN. As another example, to support additional air interface channels in a coverage area, it may be necessary to increase power amplification for the coverage area, by installing additional power amplifiers or upgrading existing power amplifiers. As still another example, to support additional channels in a coverage area, it may be necessary to increase backhaul capacity by running additional cables or implementing other connections between network components.

The present method addresses this dilemma, by providing for the addition of one or more carrier frequencies to a coverage area (and thus possible increase in likelihood of soft handoff) in response to threshold low load in the coverage area, such that the existing infrastructure will likely support concurrent communications on both the existing carrier frequency/frequencies and the added carrier frequency/frequencies.

Figure 2:
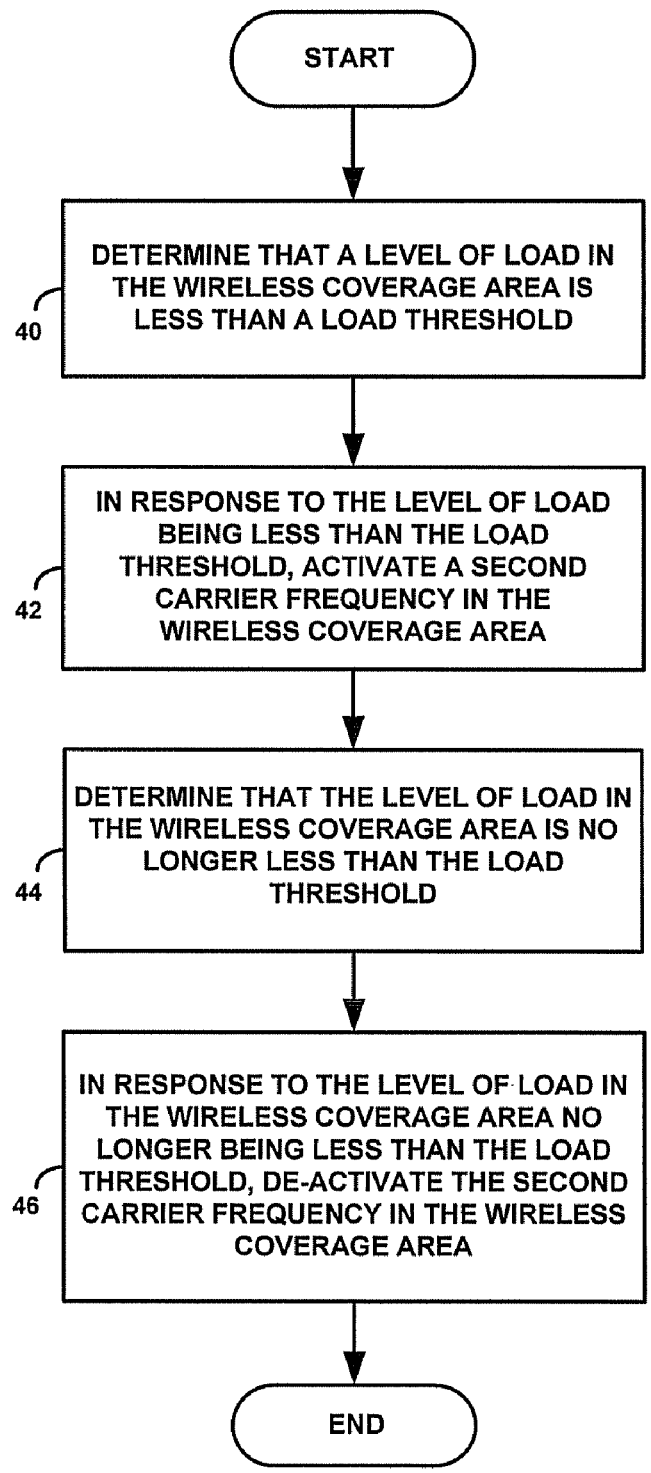
FIG. 2 is a flow chart depicting functions that can be implemented in accordance with an exemplary method.

FIG. 2 is a flow chart depicting a preferred set of method steps. These steps may be carried out among other steps by one or more components of a RAN, such as by BTS 22, 24 and/or BSC 26, or by one or more other entities in or associated with the RAN. The method is generally operable in a scenario where the RAN includes a base station that radiates to define a wireless coverage area, and in which the base station operates on a first carrier frequency in the wireless coverage area. For instance and without limitation, the method may operate in the arrangement of FIG. 1, with respect to coverage area 12, which operates on frequency F1. (In this regard, it should be understood that the act of "operating" on a given carrier frequency is a matter of intentional engineering design and is not intended to cover spurious emissions on a non-operating frequency. By the same token, if a coverage area does not operate on a given carrier frequency, any leakage or spurious emissions on that carrier frequency should be considered absent or irrelevant.)

As shown in FIG. 2, at step 40, the method involves determining that a level of load in the wireless coverage area is less than a load threshold. In turn, at step 42, the method involves, in response to the level of load being less than the load threshold (e.g., in response to the determining that the level of load in the wireless coverage area is less than the load threshold), activating a second carrier frequency in the wireless coverage area, so that the base station operates on both the first carrier frequency and the second carrier frequency in the wireless coverage area.

The "load threshold" in the wireless coverage area can take various forms and can include various parameters (e.g., multiple load conditions) if desired. Further, the load threshold can vary from coverage area to coverage area, and possibly over time or based on one or more conditions. Generally, the load threshold represents a level of use in the coverage area.

By way of example, the load threshold may be a percentage of resource usage. For instance, if the coverage area has a certain maximum forward link power for transmissions to WCDs or defined in some other manner, the load threshold could be a certain percentage of the forward link power in use. Likewise, if the coverage area has a certain number of channel elements, the load threshold could be a certain percentage of the channel elements in use. Alternatively, the load threshold may be a specific value, such as a specific measure of forward link power in use or a specific number of channel elements in use. For instance, the load threshold could be 10 mW of forward link power in use, or more generally a level of forward link power determined based on a consideration of how much overhead channel power the added carrier frequency/frequencies would use. Or the load threshold could be 60% of channel elements in use, or some number of channel elements in use, considering how many channel elements may need to be used for overhead channels on the added frequency/frequencies.

Numerous other load metrics could be used as well. Further, as noted above, the load threshold could comprise a combination of load metrics, such as a certain level of power usage in combination with a certain level of channel element usage, and/or one or more other metrics (such as MAC address availability, IP address availability, etc.)

The act of determining that the level of load in the wireless coverage area is less than the load threshold may involve simply determining that the load is less than the load threshold. Alternatively, the act may involve application of hysteresis, such as by requiring the load to be lower than the load threshold for at least a threshold period of time for instance (so as to avoid taking action in response to a momentary dip below the load threshold). In addition, it should be understood that the act of determining that the load is less than the load threshold may involve determining that the load matches the load threshold (where, in that instance, the load threshold is considered to be just below a level where carrier frequency activation would be justified). In either case, this act may be a matter of determining that the load is currently less than the load threshold, based on current analysis of load conditions. A BSC or other entity can make this determination based on its records of current usage.

The act of determining that the level of load in the wireless coverage area is less than the load threshold may involve analyzing load history over time and identifying a time of day when the level of load in the wireless coverage area tends to be less than the load threshold. For instance, BSC 26 may maintain data records indicating over time the extent of load in the coverage area, and the BSC may programmatically analyze those records on an ongoing (e.g., periodic) basis to identify trends in the form of statistical measures (e.g., averages) of load per time (e.g., time range), day of week, date, or the like (cooperatively "time of day"). And the BSC may store data that correlates times of day with typical load levels or that indicates in a Boolean manner what times of day the load tends to be less than the load threshold. In turn, the BSC or another entity can then programmatically keep track of the current time, and when the current time matches a time that the stored data indicates the load tends to be less than the load threshold, the entity may programmatically conclude that the level of load in the wireless coverage area is less than the load threshold. In that case, the determination is based on statistical or historical analysis, regardless of whether the determination is in fact correct in every instance.

In turn, the function of activating the second carrier frequency in response to the level of load being less than the load threshold may involve automatically activating the second carrier frequency in response to the analysis of load indicating that current load is less than the load threshold, or in response to the occurrence of a time of day that is historically associated with loads being less than the load threshold.

The concept of "activating" a carrier frequency in a coverage area may take various forms, ranging in complexity. At a minimum, the assumption is that the RAN would be programmed, structured, and/or otherwise arranged to be able to communicate on the added carrier frequency. Thus, to the extent a license would be required to legitimately use the added carrier frequency (e.g., a governmental license), the assumption is that such a license either exists or would be obtained dynamically. Further, to the extent structure such as filters or the like would be necessary to implement the carrier frequency, the assumption is that such filters or the transmissions on the added carrier frequency. Further, the RAN may engage in other sorts of signaling with served WCDs to publish the availability of the added carrier frequency.

As further shown in FIG. 2, the method may next involve deactivating the added carrier frequency when the load is considered to no longer be below the load threshold. In particular, at step 44, the method may involve determining that the level of load in the wireless coverage area is no longer less than the load threshold. And at step 46, the method may involve, responsive to the level of load in the wireless coverage area no longer being less than the load threshold, deactivating the second carrier frequency in the wireless coverage area, so that the base station operates in the wireless coverage area on the first carrier frequency but not on the second carrier frequency.

The functions of steps 44 and 46 may involve considerations similar to those discussed above with respect to steps 40 and 42. For instance, the act of determining that the load is no longer lower than the load threshold may involve consideration of hysteresis, may involve making the determination based on historical trends and current time of day, or may involve making the determination based on current analysis of one or more load metrics. Likewise, the act of de-activating the carrier frequency may involve removing the carrier frequency from the CLM of the coverage area at issue (and discontinuing broadcast of the CLM on that carrier frequency) and, if the carrier frequency was added to the CLM of an adjacent coverage area, removing the carrier frequency from the CLM of that adjacent coverage area. Other mechanisms for performing steps 44 and 46 may be possible as well.

The method of claim 2 may apply in a RAN that includes a first base station radiating to define a first wireless coverage area and a second base station radiating to define a second wireless coverage area. In such a RAN, the first base station would normally operate on a first like would exist or could be implemented programmatically, through digital signal processing for instance.

One way to activate a carrier frequency in the present method is to programmatically add the carrier frequency to the CLM (or each CLM) of the coverage area, and perhaps broadcast the CLM(s) on the added carrier frequency. For instance, for RAN 12 to activate carrier frequency F2 in coverage area 14, the RAN may add frequency F2 (or an associated channel indication) to the CLM broadcast in coverage area 14, and may cause that CLM to be broadcast in coverage area 14 on both frequency F1 and frequency F2.

Furthermore, in a situation where an adjacent coverage area was operating on one or more overlay frequencies but did not include the overlay frequency/frequencies in its CLM so as to foster soft handoff, the RAN may add the added carrier frequency to the CLM of that adjacent coverage area as well. For instance, if RAN 12 activates carrier frequency F2 in coverage area 14, the RAN may not only add frequency F2 to the CLM of coverage area 14 and broadcast the CLM on frequency F2 in coverage area 14, but the RAN my also add frequency F2 to the CLM of coverage area 16 and broadcast the CLM on frequency F2 in coverage area 16. More particularly, for instance, a BSC governing a BTS of coverage area 14 and a BTS of coverage area 16 may signal to each BTS to implement this change in CLM structure and transmission frequency. By doing this, it becomes possible for WCDs to hash onto frequency F2 in both coverage areas 14 and 16, thus facilitating soft handoff on F2 between those coverage areas.

Other ways to activate a carrier frequency in a coverage area may be possible as well, depending on the air interface protocol in use and/or depending on other factors. For instance, the RAN may activate a carrier frequency by programmatically modifying filters so as to enable carrier frequency in the first wireless coverage area, and the second base station would normally operate on both the first carrier and a second carrier frequency in the second wireless coverage area. Further, the first wireless coverage area and second wireless coverage area would overlap to allow handoff of WCDs between the first wireless coverage area and the second wireless coverage area. Using the arrangement of FIG. 1 as an example, coverage area 14 may be the first wireless coverage area, and coverage area 16 may be the second wireless coverage area, with the two coverage areas 14, 16 shown overlapping to facilitate WCD handoff. As with the method of FIG. 2, the steps of FIG. 3 may be carried out, possibly among other steps, by a BSC, a BTS, and/or one or more other entities.

In such an arrangement, step 40 of FIG. 2 would involve determining that a level of load in the first wireless coverage area is less than a load threshold. In turn, step 42 would involve, responsive to the level of load in the first wireless coverage area being less than the load threshold, activating the second carrier frequency in the first wireless coverage area, so that the first base station operates on both the first carrier frequency and the second carrier frequency, to thereby reduce likelihood of inter-frequency handoff between the first wireless coverage area and the second wireless coverage area.

The method in this arrangement can likewise be implemented by one or more entities of RAN 12 or one or more entities associated with RAN 12 for instance. Further, the act of determining that the load in the first wireless coverage area is less than the load threshold may comprise analyzing load history over time and identifying a time of day when the level of load in the first wireless coverage area tends to be less than the load threshold and/or may involve analyzing a current load of the first wireless coverage area and thereby determining that the current load is less than the load threshold, possibly considering hysteresis.

Still further, the act of determining that the load in the first wireless coverage area is less than the load threshold may involve determining that less than a threshold extent of at least one air interface resource for the wireless coverage area is currently in use. The air interface resource(s) may include power, channel elements, or one or more other resources. Thus, for instance, the act of determining that less than the threshold extent of at least one air interface resource for the wireless coverage area is currently in use may involve determining that current forward link power usage for the wireless coverage area is less than a power threshold. Alternatively or additionally, the act of determining that less than the threshold extent of at least one air interface resource for the wireless coverage area is currently in use may involve determining that less than a threshold extent of channel element resources is currently in use for the wireless coverage area.

In turn, the act of activating the second carrier frequency may involve activating the second carrier frequency in response to an analysis showing that the actual level of load is currently less than the load threshold, or in response to determining that the current time of day is a time when load in the coverage area tends to be less than the load threshold.

In this arrangement, the method may also include the function of deactivating the added carrier frequency in response to the load no longer being less than the load threshold, again possibly considering hysteresis and possibly based on time of day and historical trends. In particular, step 44 may involve determining that the level of load in the first wireless coverage area is no longer less than the load threshold. And step 46 may involve, responsive to the level of load in the first wireless coverage area no longer being less than the load threshold, de-activating the second carrier frequency in the first wireless coverage area, so that the first base station operates in the first wireless coverage area on the first carrier frequency but not on the second carrier frequency.

The function of activating the carrier frequency may also take various forms such as those described above. For example, when the first base station operates on the first carrier frequency but not on the second carrier frequency and the second base station operates on the first carrier frequency and the second carrier frequency, the first base station may normally broadcast a first CLM on the first carrier frequency and the first CLM may list the first carrier frequency but not the second carrier frequency. In that situation, the function of activating the second carrier frequency in the first wireless coverage area may involve causing the first base station to list in the first CLM both the first carrier frequency and the second carrier frequency and to broadcast the first CLM on both the first carrier frequency and the second carrier frequency. As noted above, for instance, the BSC may carry out the method and may cause a BTS to modify the content and transmission of its CLM through signaling with the BTS.

As another example, when the first base station operates on the first carrier frequency but not on the second carrier frequency and the second base station operates on the first carrier frequency and the second carrier frequency, the second base station may normally a second CLM on the first carrier frequency but not the second carrier frequency and the second CLM lists the first carrier frequency but not the second carrier frequency. In that situation, when activating the second carrier frequency in the first wireless coverage area, the method may involve causing the second base station to list in the second CLM both the first carrier frequency and the second carrier frequency and to broadcast the second CLM on both the first carrier frequency and the second carrier frequency.

An exemplary embodiment of the present method has been shown and described. Those of ordinary skill in the art will appreciate that numerous modifications from the embodiment described are possible, while remaining within the scope of the claims.

We claim:

1. In a radio access network comprising a base station that radiates to define a wireless coverage area, wherein the base station operates on a first carrier frequency in the wireless coverage area, a method comprising:
    determining that a level of load in the wireless coverage area is less than a load threshold; and
    in response to the level of load being less than the load threshold, activating a second carrier frequency in the wireless coverage area, so that the base station operates on both the first carrier frequency and the second carrier frequency in the wireless coverage area.

2. The method of claim 1, wherein determining that the level of load in the wireless coverage area is less than the load threshold comprises:
    analyzing load history over time and identifying a time of day when the level of load in the wireless coverage area tends to be less than the load threshold; and
    determining that the level of load in the wireless coverage area is less than the load threshold responsive to a current time being the identified time of day.

3. The method of claim 2, wherein activating the second carrier frequency in response to the level of load being less than the load threshold comprises automatically activating the second carrier frequency in response to occurrence of the identified time of day.

4. The method of claim 1, wherein determining that the level of load in the wireless coverage area is less than the load threshold comprises analyzing a current load of the wireless coverage area and thereby determining that the current load is less than the load threshold.

5. The method of claim 4, wherein activating the second carrier frequency in response to the level of load being less than the load threshold comprises activating the second carrier frequency in response to determining that the current load is less than the load threshold.

6. The method of claim 1, further comprising, after activating the second wireless carrier in the wireless coverage area:
    determining that the level of load in the wireless coverage area is no longer less than the load threshold; and
    responsive to the level of load in the wireless coverage area no longer being less than the load threshold, de-activating the second carrier frequency in the wireless coverage area, so that the base station operates in the wireless coverage area on the first carrier frequency but not on the second carrier frequency.

7. The method of claim 1, wherein determining that the level of load in the wireless coverage area is less than the load threshold comprises determining that current forward link power usage for the wireless coverage area is less than a power threshold.

8. The method of claim 1, wherein determining that the level of load in the wireless coverage area is less than the load threshold comprises determining that less than a threshold extent of channel element resources is currently in use for the wireless coverage area.

9. In a radio access network comprising a first base station that radiates to define a first wireless coverage area and a second base station that radiates to define a second wireless coverage area, wherein the first base station operates on a first carrier frequency in the first wireless coverage area, wherein the second base station operates on both the first carrier and a second carrier frequency in the second wireless coverage area, and wherein the first wireless coverage area and second wireless coverage area overlap to allow handoff of wireless communication devices between the first wireless coverage area and the second wireless coverage area, a method comprising:
    determining that a level of load in the first wireless coverage area is less than a load threshold; and
    responsive to the level of load in the first wireless coverage area being less than the load threshold, activating the second carrier frequency in the first wireless coverage area, so that the first base station operates on both the first carrier frequency and the second carrier frequency, to thereby reduce likelihood of inter-frequency handoff between the first wireless coverage area and the second wireless coverage area.

10. The method of claim 9, wherein determining that the level of load in the first wireless coverage area is less than the load threshold comprises analyzing load history over time and identifying a time of day when the level of load in the first wireless coverage area tends to be less than the load threshold.

11. The method of claim 10, wherein activating the second carrier frequency in the first wireless coverage area in response to the level of load being less than the load threshold comprises automatically activating the second carrier frequency in the first wireless coverage area in response to occurrence of the identified time of day.

12. The method of claim 9, wherein determining that the level of load in the first wireless coverage area is less than the load threshold comprises analyzing a current load of the first wireless coverage area and thereby determining that the current load is less than the load threshold.

13. The method of claim 12, wherein activating the second carrier frequency in the first wireless coverage area in response to the level of load being less than the load threshold comprises activating the second carrier frequency in the first wireless coverage area in response to determining that the current load is less than the load threshold.

14. The method of claim 9, further comprising, after activating the second wireless carrier in the first wireless coverage area:
    determining that the level of load in the first wireless coverage area is no longer less than the load threshold; and
    responsive to the level of load in the first wireless coverage area no longer being less than the load threshold, de-activating the second carrier frequency in the first wireless coverage area, so that the first base station operates in the first wireless coverage area on the first carrier frequency but not on the second carrier frequency.

15. The method of claim 9, wherein, when the first base station operates on the first carrier frequency but not on the second carrier frequency and the second base station operates on the first carrier frequency and the second carrier frequency, the first base station broadcasts a first channel list message (CLM) on the first carrier frequency and the first CLM lists the first carrier frequency but not the second carrier frequency, and wherein activating the second carrier frequency in the first wireless coverage area comprises:

causing the first base station to list in the first CLM both the first carrier frequency and the second carrier frequency and to broadcast the first CLM on both the first carrier frequency and the second carrier frequency.

16. In a radio access network comprising a first base station that radiates to define a first wireless coverage area and a second base station that radiates to define a second wireless coverage area, wherein the first base station operates on a first carrier frequency in the first wireless coverage area, wherein the second base station operates on both the first carrier and a second carrier frequency in the second wireless coverage area, and wherein the first wireless coverage area and second wireless coverage area overlap to allow handoff of wireless communication devices between the first wireless coverage area and the second wireless coverage area, a method comprising:

determining that a level of load in the first wireless coverage area is less than a load threshold; and responsive to the level of load in the first wireless coverage area being less than the load threshold, activating the second carrier frequency in the first wireless coverage area, so that the first base station operates on both the first carrier frequency and the second carrier frequency, to thereby reduce likelihood of inter-frequency handoff between the first wireless coverage area and the second wireless coverage area, wherein, when the first base station operates on the first carrier frequency but not on the second carrier frequency and the second base station operates on the first carrier frequency and the second carrier frequency, the first base station broadcasts a first channel list message (CLM) on the first carrier frequency and the first CLM lists the first carrier frequency but not the second carrier frequency, and wherein activating the second carrier frequency in the first wireless coverage area comprises causing the first base station to list in the first CLM both the first carrier frequency and the second carrier frequency and to broadcast the first CLM on both the first carrier frequency and the second carrier frequency, and wherein, when the first base station operates on the first carrier frequency but not on the second carrier frequency and the second base station operates on the first carrier frequency and the second carrier frequency, the second base station broadcasts a second CLM on the first carrier frequency but not the second carrier frequency and the second CLM lists the first carrier frequency but not the second carrier frequency, the method further comprising, when activating the second carrier frequency in the first wireless coverage area, causing the second base station to list in the second CLM both the first carrier frequency and the second carrier frequency and to broadcast the second CLM on both the first carrier frequency and the second carrier frequency.

17. The method of claim 9, wherein determining that the level of load in the first wireless coverage area is less than the load threshold comprises determining that less than a threshold extent of at least one air interface resource for the wireless coverage area is currently in use.

18. The method of claim 17, wherein determining that less than the threshold extent of at least one air interface resource for the wireless coverage area is currently in use comprises determining that current forward link power usage for the wireless coverage area is less than a power threshold.

19. The method of claim 17, wherein determining that less than the threshold extent of at least one air interface resource for the wireless coverage area is currently in use comprises determining that less than a threshold extent of channel element resources is currently in use for the wireless coverage area.

* * * * *